United States Patent
Li et al.

(10) Patent No.: US 11,519,255 B2
(45) Date of Patent: Dec. 6, 2022

(54) DOWNHOLE TOOL DYNAMIC AND MOTION MEASUREMENT WITH MULTIPLE ULTRASOUND TRANSDUCER

(71) Applicant: Halliburton Energy Services, Inc., Houston, TX (US)

(72) Inventors: Peng Li, Houston, TX (US); Yu Weng, Kingwood, TX (US); Chung Chang, Houston, TX (US); Rodney Marlow, Spring, TX (US); Boguslaw Wiecek, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 170 days.

(21) Appl. No.: 16/579,793

(22) Filed: Sep. 23, 2019

(65) Prior Publication Data

US 2020/0116005 A1  Apr. 16, 2020

Related U.S. Application Data

(60) Provisional application No. 62/746,461, filed on Oct. 16, 2018.

(51) Int. Cl.
*E21B 44/00* (2006.01)
*E21B 47/024* (2006.01)
(Continued)

(52) U.S. Cl.
CPC .............. *E21B 44/00* (2013.01); *E21B 7/04* (2013.01); *E21B 45/00* (2013.01); *E21B 47/024* (2013.01);
(Continued)

(58) Field of Classification Search
CPC ........ E21B 44/00; E21B 47/024; E21B 47/09; E21B 47/08; E21B 47/085; E21B 49/003; E21B 7/04; E21B 45/00; G01V 1/50
See application file for complete search history.

(56) References Cited

U.S. PATENT DOCUMENTS 4,661,933 A * 4/1987 Seeman ................ E21B 47/085 367/27
5,469,736 A   11/1995 Moake
(Continued)

FOREIGN PATENT DOCUMENTS

CA  2636564 A1 * 12/2009 ........... E21B 47/022
CN  101868595 A * 10/2010 ............. E21B 44/00
(Continued)

OTHER PUBLICATIONS

International Search Report and Written Opinion for Application No. PCT/US2019/052979, dated Jan. 6, 2020.

*Primary Examiner* — Douglas Kay
(74) *Attorney, Agent, or Firm* — Benjamin Ford; C. Tumey Law Group PLLC

(57) ABSTRACT

A method and system method for determining motion of a downhole tool and feeding back drilling performance. The method may comprise taking a synchronous tool face measurement of the downhole tool, taking a synchronous pulse-echo acquisition to estimate a shape of a borehole, inputting at least the shape of the borehole, the center trajectory of the downhole tool, the rotational time of the downhole tool, the position of the downhole tool, and the one or more measurements of the downhole tool into an information fusion for drilling dynamics, identifying at least one of a whirl, a vibration, or a stick-slip of the downhole tool, and identifying one or more borehole condition and a drilling efficiency. A system may comprise a downhole tool, at least two transducers, and an information handling system.

22 Claims, 11 Drawing Sheets

(51) Int. Cl.
*E21B 47/09* (2012.01)
*E21B 49/00* (2006.01)
*E21B 7/04* (2006.01)
*E21B 45/00* (2006.01)
*G01V 1/50* (2006.01)

(52) U.S. Cl.
CPC ............ *E21B 47/09* (2013.01); *E21B 49/003* (2013.01); *G01V 1/50* (2013.01)

(56) References Cited

U.S. PATENT DOCUMENTS

| | | | |
|---|---|---|---|
| 5,899,958 A * | 5/1999 | Dowell | E21B 47/12 |
| | | | 702/6 |
| 6,065,219 A | 5/2000 | Murphey et al. | |
| 6,518,756 B1 | 2/2003 | Morys et al. | |
| 8,260,554 B2 | 9/2012 | Morys | |
| 9,194,936 B1 * | 11/2015 | Keegan | G01S 5/0221 |
| 10,472,893 B2 * | 11/2019 | Benson | E21B 47/024 |
| 10,508,534 B2 * | 12/2019 | Guner | E21B 47/092 |
| 2006/0248735 A1 | 11/2006 | Haugland | |
| 2014/0129148 A1 * | 5/2014 | Harmer | E21B 44/005 |
| | | | 702/9 |
| 2016/0011295 A1 * | 1/2016 | Keegan | G01S 5/0273 |
| | | | 455/456.1 |
| 2016/0362971 A1 * | 12/2016 | Benson | E21B 7/062 |
| 2017/0115423 A1 * | 4/2017 | Hori | G01V 1/50 |
| 2017/0212263 A1 * | 7/2017 | Zhang | G01V 1/40 |
| 2018/0101915 A1 * | 4/2018 | Benson | E21B 7/00 |
| 2018/0106142 A1 | 4/2018 | Nguyen et al. | |
| 2018/0266239 A1 * | 9/2018 | Jarrot | E21B 47/002 |
| 2019/0226323 A1 * | 7/2019 | Pedrycz | G01V 1/48 |

FOREIGN PATENT DOCUMENTS

| | | | |
|---|---|---|---|
| WO | 02-068796 | 9/2002 | |
| WO | WO-02068796 A1 * | 9/2002 | ........... E21B 47/085 |

* cited by examiner

—— THE REAL BOREHOLE
— — THE CALCULATED BOREHOLE
—— THE REAL TOOL MOTION

DOWNHOLE TOOL DYNAMIC AND MOTION MEASUREMENT WITH MULTIPLE ULTRASOUND TRANSDUCER

BACKGROUND

Boreholes drilled into subterranean formations may enable recovery of desirable fluids (e.g., hydrocarbons) using any number of different techniques. Currently, drilling operations may identify subterranean formations through a bottom hole assembly if the subterranean formation is disposed horizontal to the bottom hole assembly. In measurement operations, a measurement assembly may operate and/or function to determine the shape of a borehole. During measurement operations it may be important to determine where the center of the measurement assembly may be in relation to the borehole wall.

Currently, the most advanced high frequency drilling dynamic measurements used in measurement operation utilize accelerometers to determine the center and motion of the measurement assembly. Accelerometers are unable to provide accurate tool body rigid motions. Tool center rotational trajectory based upon the integration of acceleration measurements often results in a numerically unstable trajectory. Conventional accelerometer or pressure sensor-based drilling dynamic logging systems cannot provide direct tool motion trajectories. The accelerometer logged vibration can be highly subjective to all kinds of noises due to bit bounce and impacts, tool center trajectory based upon integration of acceleration measurements often results in numerically unstable results, which may not be reliable Existing methods for calculating borehole shapes, tool center rotational trajectory, or other downhole measurements usually have more or less pre-assumptions of the borehole geometry. Either boreholes are assumed in one specific type of geometry (e.g., ellipse) or portion of boreholes is assumed remaining circular shapes, which largely limits the effectiveness on more complex geometric shapes such as irregular boreholes. Current unreliable measurements of borehole shapes and conventional accelerometer or pressure sensor measurements may not provide direct tool motion trajectories in a drilling dynamic logging system.

BRIEF DESCRIPTION OF THE DRAWINGS

These drawings illustrate certain aspects of some examples of the present disclosure and should not be used to limit or define the disclosure.

DETAILED DESCRIPTION

This disclosure may generally relate to downhole measurement systems and, more particularly, to a system and method of a bottom hole assembly measurement system configured to calculate both borehole shapes and tool center (i.e., the center of the measurement assembly) to form tool motion related drilling dynamics logging. The system may include multiple ultrasonic transceivers or transducers/receivers to measure the tool location with respect to a borehole wall and gyro- or magnetometer-based directional modules may be used for tool face measurement. As discussed below, pressure-based measurements are not directly linked to tool motions downhole and cannot generate motion logs. In a downhole system with multiple transducers, tool radial positional measurements do not need numerical integration and the solution is not only stable but also bounded by predicted borehole diameters. This may provide reliable tool center motion trajectory logs, from which downhole tool operations and functions may be derived.

Tool rotational information from gyro or magnetometer measurements and the tool center trajectory may allow for the calculation of tool whirl as well as its lateral vibrations. Timely feedback of this quantified information to a controller may allow for controlling drilling parameters to ensure smooth drilling operations. Depending upon the tool position with respect to the drilling bit distance, multi-transducer measurements herein may also provide borehole shape information at an offset to the drill bits. With a known time delay due to required drilling time from our sensor position to reach the current dill bit depth, one may then correlate those tool rotational and vibrational information recorded earlier to real time borehole condition while the drill bit was drilling at current transducer measurement depth. This may establish a feedback correlation loop between drilling dynamics and borehole shape geometrical quality.

Figure 1:
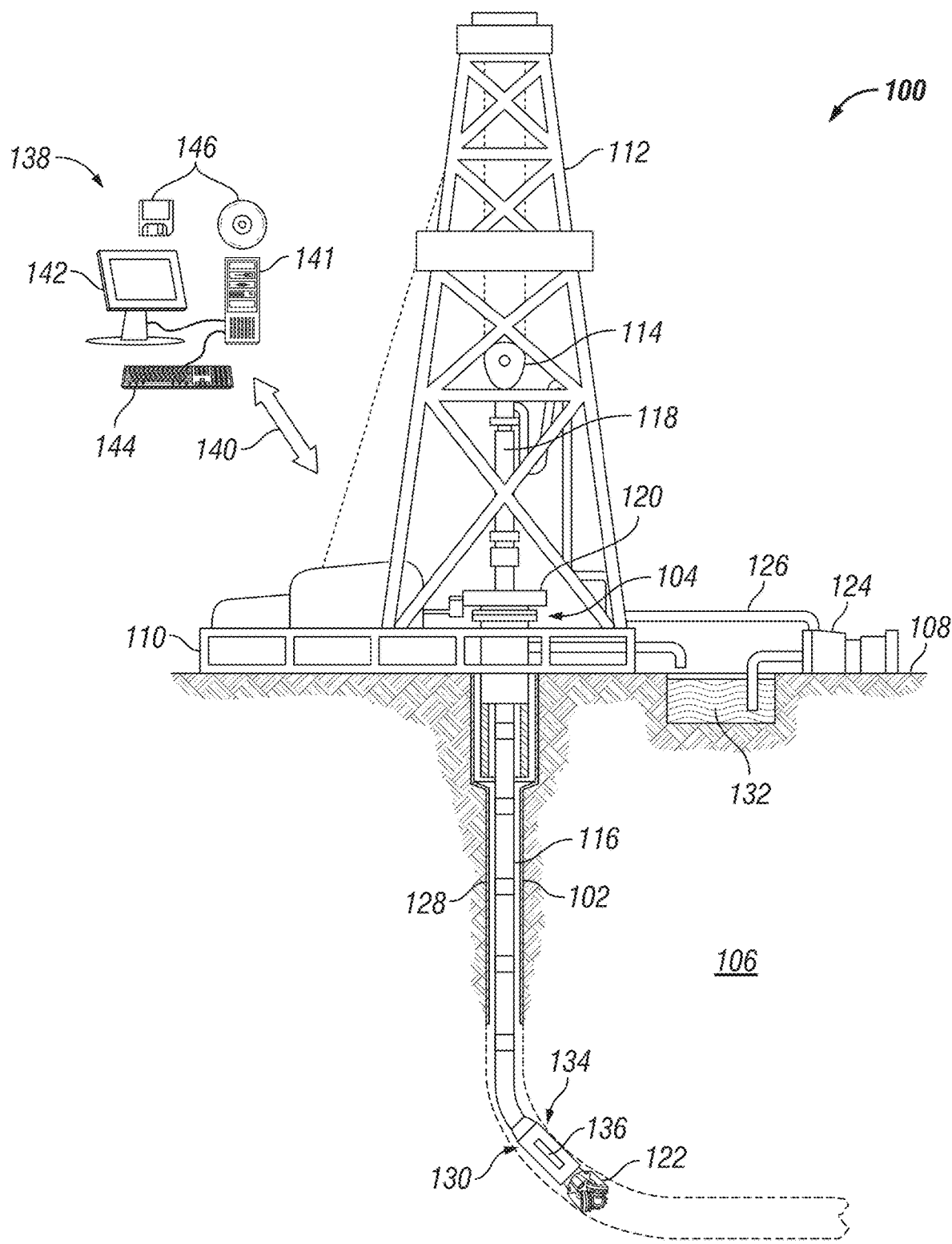
FIG. 1 illustrates an example of a drilling system.

FIG. 1 illustrates an example of drilling system 100. As illustrated, borehole 102 may extend from a wellhead 104 into a subterranean formation 106 from a surface 108. Generally, borehole 102 may include horizontal, vertical, slanted, curved, and other types of borehole geometries and orientations. Borehole 102 may be cased or uncased. In examples, borehole 102 may include a metallic member. By way of example, the metallic member may be a casing, liner, tubing, or other elongated steel tubular disposed in borehole 102.

As illustrated, borehole 102 may extend through subterranean formation 106. As illustrated in FIG. 1, borehole 102 may extend generally vertically into the subterranean formation 106, however borehole 102 may extend at an angle through subterranean formation 106, such as horizontal and slanted boreholes. For example, although FIG. 1 illustrates a vertical or low inclination angle well, high inclination angle or horizontal placement of the well and equipment may be possible. It should be further noted that while FIG. 1 generally depicts land-based operations, those skilled in the art may recognize that the principles described herein are equally applicable to subsea operations that employ floating or sea-based platforms and rigs, without departing from the scope of the disclosure.

As illustrated, a drilling platform 110 may support a derrick 112 having a traveling block 114 for raising and lowering drill string 116. Drill string 116 may include, but is not limited to, drill pipe and coiled tubing, as generally known to those skilled in the art. A kelly 118 may support drill string 116 as it may be lowered through a rotary table 120. A drill bit 122 may be attached to the distal end of drill string 116 and may be driven either by a downhole motor and/or via rotation of drill string 116 from surface 108. Without limitation, drill bit 122 may include, roller cone bits, PDC bits, natural diamond bits, any hole openers, reamers, coring bits, and the like. As drill bit 122 rotates, it may create and extend borehole 102 that penetrates various subterranean formations 106. A pump 124 may circulate drilling fluid through a feed pipe 126 through kelly 118, downhole through interior of drill string 116, through orifices in drill bit 122, back to surface 108 via annulus 128 surrounding drill string 116, and into a retention pit 132.

With continued reference to FIG. 1, drill string 116 may begin at wellhead 104 and may traverse borehole 102. Drill bit 122 may be attached to a distal end of drill string 116 and may be driven, for example, either by a downhole motor and/or via rotation of drill string 116 from surface 108. Drill bit 122 may be a part of bottom hole assembly 130 at a distal end of drill string 116. It should be noted that bottom hole assembly 130 may also be referred to as a downhole tool. Bottom hole assembly 130 may further include tools for look-ahead resistivity applications. As will be appreciated by those of ordinary skill in the art, bottom hole assembly 130 may be a measurement-while drilling (MWD) or logging-while-drilling (LWD) system.

Bottom hole assembly 130 may comprise any number of tools, transmitters, and/or receivers to perform downhole measurement operations. For example, as illustrated in FIG. 1, bottom hole assembly 130 may include a measurement assembly 134. It should be noted that measurement assembly 134 may make up at least a part of bottom hole assembly 130. Without limitation, any number of different measurement assemblies, communication assemblies, battery assemblies, and/or the like may form bottom hole assembly 130 with measurement assembly 134. Additionally, measurement assembly 134 may form bottom hole assembly 130 itself. In examples, measurement assembly 134 may comprise at least one transducer 136, which may be disposed at the surface of measurement assembly 134. Without limitation, transducer 136 may also be disposed within measurement assembly 134. Without limitation, there may be four transducers 136 that may be disposed ninety degrees from each other. However, it should be noted that there may be any number of transducers 136 disposed along bottom hole assembly 130 at any degree from each other. Transducers 136 may function and operate to generate an acoustic pressure pulse that travels through borehole fluids. In examples, transducers 136 may further sense and acquire the reflected pressure wave, which is modulated (i.e., reflected as an echo) by the borehole wall. During measurement operations, the travel time of the pulse wave from transmission to recording of the echo may be recorded. This information may lead to determining a radius of the borehole, which may be derived by the fluid sound speed. By analyzing the amplitude of the echo signal, the acoustic impedance may also be derived. Without limitation, transducers 136 may be made of piezo-ceramic crystals, or optionally magnetostrictive materials or other materials that generate an acoustic pulse when activated electrically or otherwise. In examples, transducers 136 may also include backing materials and matching layers. It should be noted that transducers 136 and assemblies housing transducers 136 may be removable and replaceable, for example, in the event of damage or failure.

Without limitation, bottom hole assembly 130 may be connected to and/or controlled by information handling system 138, which may be disposed on surface 108. Without limitation, information handling system 138 may be disposed down hole in bottom hole assembly 130. Processing of information recorded may occur down hole and/or on surface 108. Processing occurring downhole may be transmitted to surface 108 to be recorded, observed, and/or further analyzed. Additionally, information recorded on information handling system 138 that may be disposed down hole may be stored until bottom hole assembly 130 may be brought to surface 108. In examples, information handling system 138 may communicate with bottom hole assembly 130 through a communication line (not illustrated) disposed in (or on) drill string 116. In examples, wireless communication may be used to transmit information back and forth between information handling system 138 and bottom hole assembly 130. Information handling system 138 may transmit information to bottom hole assembly 130 and may receive as well as process information recorded by bottom hole assembly 130. In examples, a downhole information handling system (not illustrated) may include, without limitation, a microprocessor or other suitable circuitry, for estimating, receiving and processing signals from bottom hole assembly 130. Downhole information handling system (not illustrated) may further include additional components, such as memory, input/output devices, interfaces, and the like. In examples, while not illustrated, bottom hole assembly 130 may include one or more additional components, such as analog-to-digital converter, filter and amplifier, among others, that may be used to process the measurements of bottom hole assembly 130 before they may be transmitted to surface 108. Alternatively, raw measurements from bottom hole assembly 130 may be transmitted to surface 108.

Any suitable technique may be used for transmitting signals from bottom hole assembly 130 to surface 108, including, but not limited to, wired pipe telemetry, mud-pulse telemetry, acoustic telemetry, and electromagnetic telemetry. While not illustrated, bottom hole assembly 130 may include a telemetry subassembly that may transmit telemetry data to surface 108. At surface 108, pressure transducers (not shown) may convert the pressure signal into electrical signals for a digitizer (not illustrated). The digitizer may supply a digital form of the telemetry signals to information handling system 138 via a communication link 140, which may be a wired or wireless link. The telemetry data may be analyzed and processed by information handling system 138.

As illustrated, communication link 140 (which may be wired or wireless, for example) may be provided that may transmit data from bottom hole assembly 130 to an information handling system 138 at surface 108. Information handling system 138 may include a personal computer 141, a video display 142, a keyboard 144 (i.e., other input devices.), and/or non-transitory computer-readable media 146 (e.g., optical disks, magnetic disks) that can store code representative of the methods described herein. In addition to, or in place of processing at surface 108, processing may occur downhole.

As discussed below, methods may be utilized by information handling system 138 to determine properties of subterranean formation 106. Information may be utilized to produce an image, which may be generated into a two- or three-dimensional models of subterranean formation 106. These models may be used for well planning, (e.g., to design a desired path of borehole 102). Additionally, they may be used for planning the placement of drilling systems within a prescribed area. This may allow for the most efficient drilling operations to reach a subsurface structure. During drilling operations, measurements taken within borehole 102 may be used to adjust the geometry of borehole 102 in real time to reach a geological target. Measurements collected from bottom hole assembly 130 of the formation properties may be used to steer drilling system 100 toward a subterranean formation 106.

Figure 2:
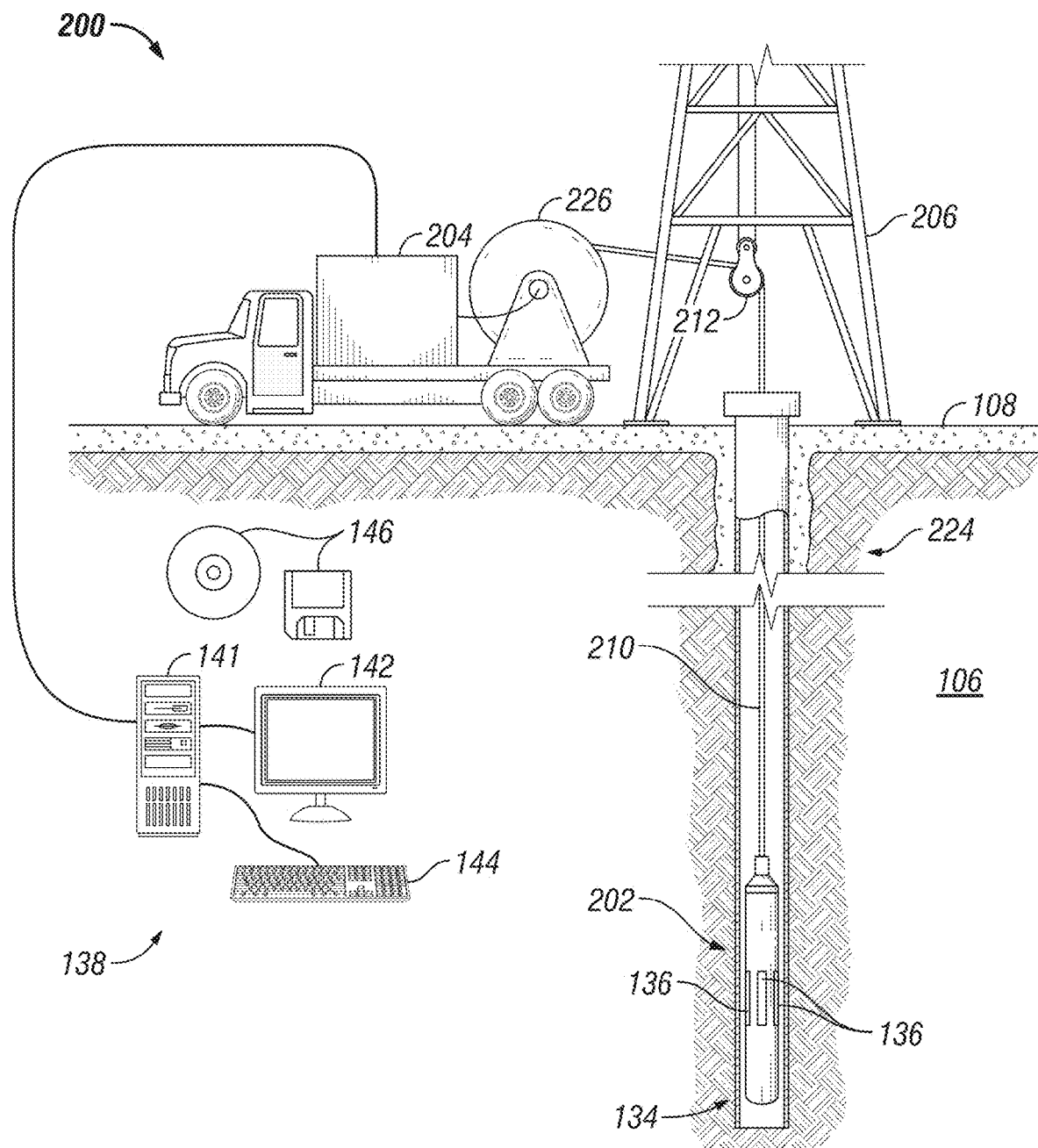
FIG. 2 illustrates an example of a well measurement system.

FIG. 2 illustrates a cross-sectional view of an example of well measurement system 200. As illustrated, well measurement system 200 may comprise downhole tool 202 attached a vehicle 204. In examples, it should be noted that downhole tool 202 may not be attached to a vehicle 204. Downhole tool 202 may be supported by rig 206 at surface 108. Downhole tool 202 may be tethered to vehicle 204 through conveyance 210. Conveyance 210 may be disposed around one or more sheave wheels 212 to vehicle 204. Conveyance 210 may include any suitable means for providing mechanical conveyance for downhole tool 202, including, but not limited to, wireline, slickline, coiled tubing, pipe, drill pipe, downhole tractor, or the like. In some embodiments, conveyance 210 may provide mechanical suspension, as well as electrical and/or optical connectivity, for downhole tool 202. Conveyance 210 may comprise, in some instances, a plurality of electrical conductors and/or a plurality of optical conductors extending from vehicle 204, which may provide power and telemetry. In examples, an optical conductor may utilize a battery and/or a photo conductor to harvest optical power transmitted from surface 108. Conveyance 210 may comprise an inner core of seven electrical conductors covered by an insulating wrap. An inner and outer steel armor sheath may be wrapped in a helix in opposite directions around the conductors. The electrical and/or optical conductors may be used for communicating power and telemetry between vehicle 204 and downhole tool 202. Information from downhole tool 202 may be gathered and/or processed by information handling system 138. For example, signals recorded by downhole tool 202 may be stored on memory and then processed by downhole tool 202. The processing may be performed real-time during data acquisition or after recovery of downhole tool 202. Processing may alternatively occur downhole or may occur both downhole and at surface. In some embodiments, signals recorded by downhole tool 202 may be conducted to information handling system 138 by way of conveyance 210. Information handling system 138 may process the signals, and the information contained therein may be displayed for an operator to observe and be stored for future processing and reference. Information handling system 138 may also contain an apparatus for supplying control signals and power to downhole tool 202.

Systems and methods of the present disclosure may be implemented, at least in part, with information handling system 138. While shown at surface 108, information handling system 138 may also be located at another location, such as remote from borehole 102. Information handling system 138 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 138 may be a personal computer 141, a network storage device, or any other suitable device and may vary in size, shape, performance, functionality, and price. Information handling system 138 may include random access memory (RAM), one or more processing resources such as a central processing unit (CPU) or hardware or software control logic, ROM, and/or other types of nonvolatile memory. Additional components of the information handling system 138 may include one or more disk drives, one or more network ports for communication with external devices as well as various input and output (I/O) devices, such as a keyboard 144, a mouse, and a video display 142. Information handling system 138 may also include one or more buses operable to transmit communications between the various hardware components. Furthermore, video display 142 may provide an image to a user based on activities performed by personal computer 141. For example, producing images of geological structures created from recorded signals. By way of example, video display unit may produce a plot of depth versus the two cross-axial components of the gravitational field and versus the axial component in borehole coordinates. The same plot may be produced in coordinates fixed to the Earth, such as coordinates directed to the North, East and directly downhole (Vertical) from the point of entry to the borehole. A plot of overall (average) density versus depth in borehole or vertical coordinates may also be provided. A plot of density versus distance and direction from the borehole versus vertical depth may be provided. It should be understood that many other types of plots are possible when the actual position of the measurement point in North, East and Vertical coordinates is taken into account. Additionally, hard copies of the plots may be produced in paper logs for further use.

Alternatively, systems and methods of the present disclosure may be implemented, at least in part, with non-transitory computer-readable media 146. Non-transitory computer-readable media 146 may include any instrumentality or aggregation of instrumentalities that may retain data and/or instructions for a period of time. Non-transitory computer-readable media 146 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 206 includes a load cell (not shown), which may determine the amount of pull on conveyance 210 at the surface of borehole 102. Information handling system 138 may comprise a safety valve (not illustrated), which controls the hydraulic pressure that drives drum 226 on vehicle 204, which may reel up and/or release conveyance 210, which may move downhole tool 202 up and/or down borehole 102. The safety valve may be adjusted to a pressure such that drum 226 may only impart a small amount of tension to conveyance 210 over and above the tension necessary to retrieve conveyance 210 and/or downhole tool 202 from borehole 102. The safety valve is typically set a few hundred pounds above the amount of desired safe pull on conveyance 210 such that once that limit is exceeded, further pull on conveyance 210 may be prevented.

As illustrated in FIG. 2, downhole tool 202 may include measurement assembly 134. It should be noted that measurement assembly 134 may make up at least a part of downhole tool 202. Without limitation, any number of different measurement assemblies, communication assemblies, battery assemblies, and/or the like may form downhole tool 202 with measurement assembly 134. Additionally, measurement assembly 134 may form downhole tool 202 itself. In examples, measurement assembly 134 may comprise at least one transducer 136, which may be disposed at the surface of measurement assembly 134. Without limitation, transducer 136 may also be disposed within measurement assembly 134. Without limitation, there may be four transducers 136 that may be disposed ninety degrees from each other. However, it should be noted that there may be any number of transducers 136 disposed along bottom hole assembly 130 at any degree from each other. Transducers 136 may function and operate to generate and receive acoustic pulses in the borehole fluid.

Figure 3:
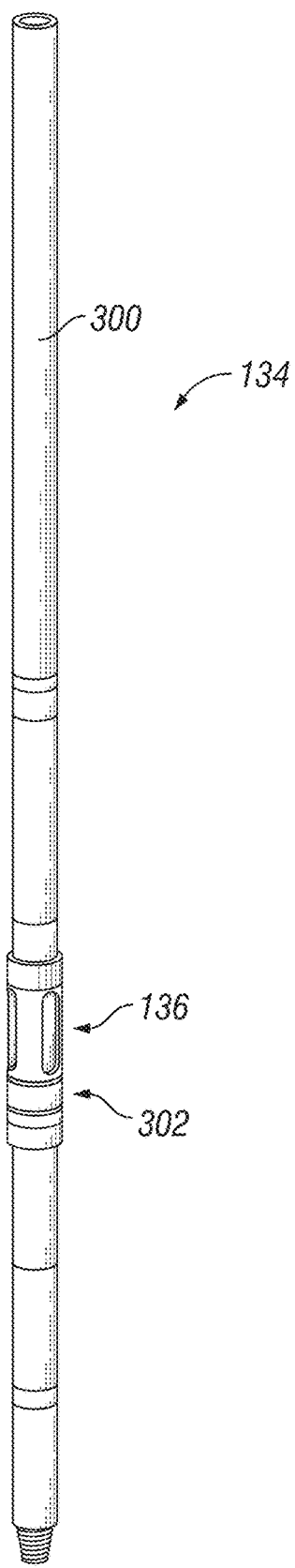
FIG. 3 illustrates an example of a measurement assembly.

FIG. 3 illustrates a close-up view of an example of measurement assembly 134. As illustrated, measurement assembly 134 may comprise at least one battery section 300 and at least on instrument section 302. Battery section 300 may operate and function to enclose and/or protect at least one battery that may be disposed in battery section 300. Without limitation, battery section 300 may also operate and function to power measurement assembly 134. Specifically, battery section 300 may power at least one transducer 136, which may be disposed at any end of battery section 300 in instrument section 302.

Instrument section 302 may house at least one transducer 136. As describe above, transducer 136 may operate and function and operate to generate an acoustic pressure pulse that travels through borehole fluids. During operations, transducer 136 may emit a pressure wave, specifically an ultrasonic pressure pulse wave. The pressure pulse may have a frequency range from about 200 kHz to about 400 kHz, for example with a center around 250 KHz. It should be noted that the pulse signal may be emitted with different frequency content. As discussed above, transducers 136 may be referred to as a "pinger" and/or transceiver, which may allow transducers 136 to measure and/or record echoes. Recordings and/or measurements taken by transducer 136 may be transmitted to information handling system 138 by any suitable means, as discussed above.

During drilling operations, drilling dynamics and vibrations experienced by bottom hole assembly 130 and drill bit 122 (e.g., referring to FIG. 1) may damage and/or add wear to bottom hole assembly 130 and drill bit 122, which may reduce drilling performance. Operational failures may result in hundreds of millions of dollar loss due to productivity loss and increased drilling cost. During drilling operations high-frequency measurements may be utilized to determine borehole and formation properties. High-frequency measurements may provide information on drilling-system responses and vibration modes as causes for drilling inefficiency and unsatisfactory drilling performance. Without limitation, damage to drill bit 122 may be due to a transition from low-level torsional oscillations into forward whirls, backward whirls, and chaotic whirls. It should be noted that whirls are defined as eccentric motion of drill bit 122 in a borehole, generally, an orbital motion either in a clockwise or counterclockwise direction. Therefore, it may be important to monitor the onset of whirls and quantify their severity. One may then feedback the information measured and/or recorded to the controller of the drilling dynamics to ensure smooth drilling process and prevent drill bit 122 from accelerated wear and damage.

In examples, a downhole tool and/or bottom hole assembly 130 may include about twenty sensors, which may continuously record data in an X direction, Y direction, Z direction, radially, and tangential accelerations, shocks, axial load, torque, inclination, bending, pressure, and temperature, etc. These sensors may operate and/or function in a high frequency band. Without limitation, wide band high frequency accelerometers may measure acceleration, which includes propagating waves. Detecting the motion of bottom hole assembly 130 (e.g., referring to FIG. 1) or downhole tool 202 may allow for the detection of whirl downhole. Previous attempts of numerically integrating of acceleration data fail to generate stable tool center trajectory. Currently, bending sensors may be utilized to derive the torsional tool center movements with limited success. This is due to bending derived tool movement that may be subject to random vibrating forces due to stabilizer or bit impact against the borehole wall.

A more accurate rigid tool center motion may come from a direct measurement. As discussed below, multi-ultrasonic-transducer caliper measurement may provide measurements of borehole properties and may generate borehole images/hole qualities and borehole acoustic impedance, which may be correlated to controllable drilling parameters (e.g., WOB, TOB, RPM, and ROP) in order to assist a smooth drilling process.

In examples, the position of measuring assembly 134 tool with respect to the distance from drill bit 122 (e.g., referring to FIG. 1), four transducer measurements may provide hole shape information at an offset to drill bit 122. It should be noted that the transducer may be a part of transducers 136 (e.g., referring to FIG. 3), which may emit a pressure pulse and record echoes. Echoes may be the reflection of the pressure pulse off the wall of a borehole. Determining time delay, rotation of measuring assembly 134, and recorded vibrational information may be correlated to real time hole condition during drilling operations at a current transducer measurement depth. It should be noted that time delay, described above, is defined as drilling time from sensor position (i.e., transducer 136) to reach depth of the current drill bit 122. Therefore, a critical feedback correlation between drilling dynamics to the shape a geometrical quality of a borehole may be established. This may allow an operator or a downhole controller (e.g., for an automated process) to recognize borehole shape variations during drilling operations and may allow changes in drilling operations to improve drilling efficiency.

Figures 4, 5:
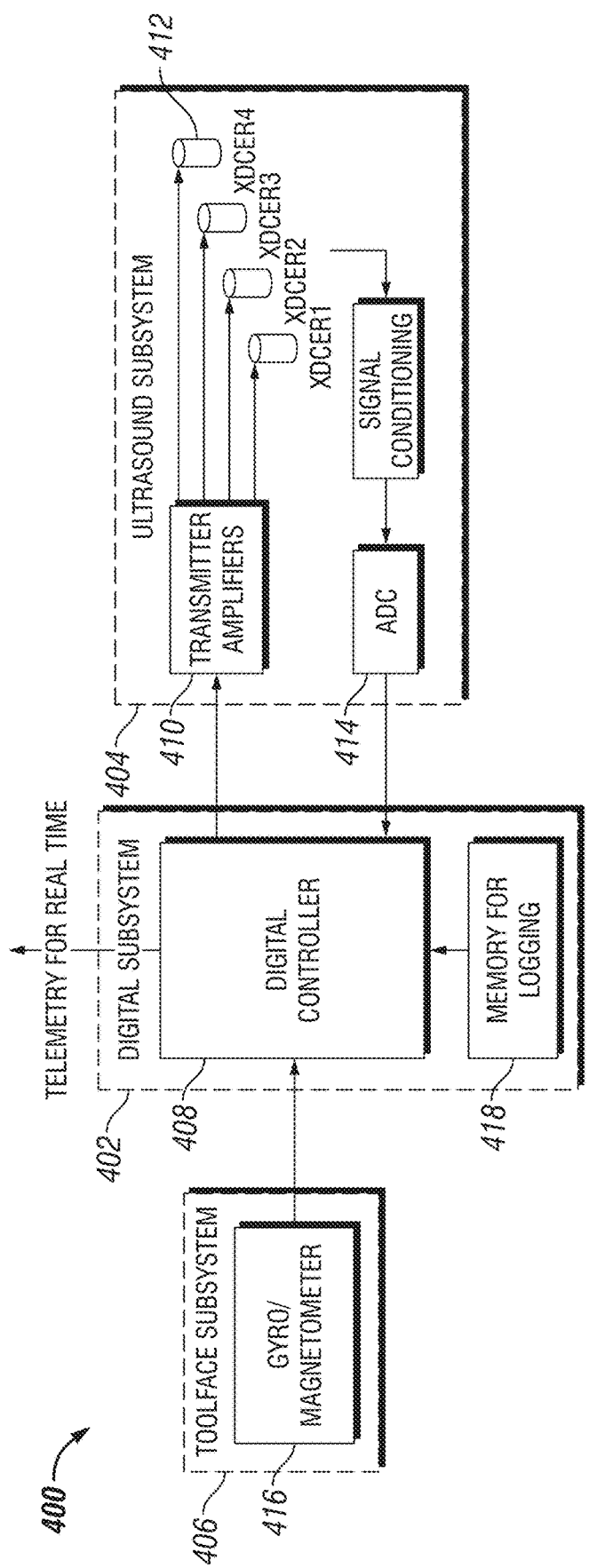
FIG. 4 is an example block diagram of the measurement assembly.
FIG. 5 illustrates a top view of the example measurement assembly.

FIG. 4 illustrates an example of a block diagram 400 of measurement assembly 134 (e.g., referring to FIG. 3). As illustrated, measurement assembly 134 may comprise a digital subsystem 402, multi-ultrasonic-transducer subsystem 404, and directional subsystem 406. These subsystems may work together to generate accurate borehole shape and the center trajectory of measurement assembly 134. In examples, digital controller 408 may act as a central control and communication unit. It should be noted that digital controller 408 may be a part of information handling system 138. Digital controller 408 may control transmitter amplifier 410 to generate pulsing pressure ultrasonic wave through at least one transducer 412 into a borehole. Additionally, digital controller 408 may control analog digital converter ("ADC") 414 to sample the reflected echoes. In examples, directional subsystem 406 may comprise a gyro or magnetometer 416. These devices may be used to log the downhole tool face and rotation information. During measurement operations, information handling system 138 may combine all measurements from digital subsystem 402, multi-ultrasonic-transducer subsystem 404, and directional subsystem 406 to generate a tool dynamic results, which may be saved into memory 418. It should be noted that tool dynamic results may be transmitted to the surface through information handling system 138 in any suitable manner as described above.

In examples, measurement assembly 134 (e.g., referring to FIG. 3) may comprise at least two transducers 412, which may operate and/or function together to accurately acquire motion of the center of measurement assembly 134. Without limitation, transducers 412 may be distributed in an evenly manner along the circumference of measurement assembly 134. In examples, increasing the number of transducers 412 may lead to better tool dynamic calculation results. FIG. 5 shows the top view of an example of measurement assembly 134 comprising four transducers 412, where transducers 412 may be 90 degrees apart around measurement assembly 134.

Figure 6:
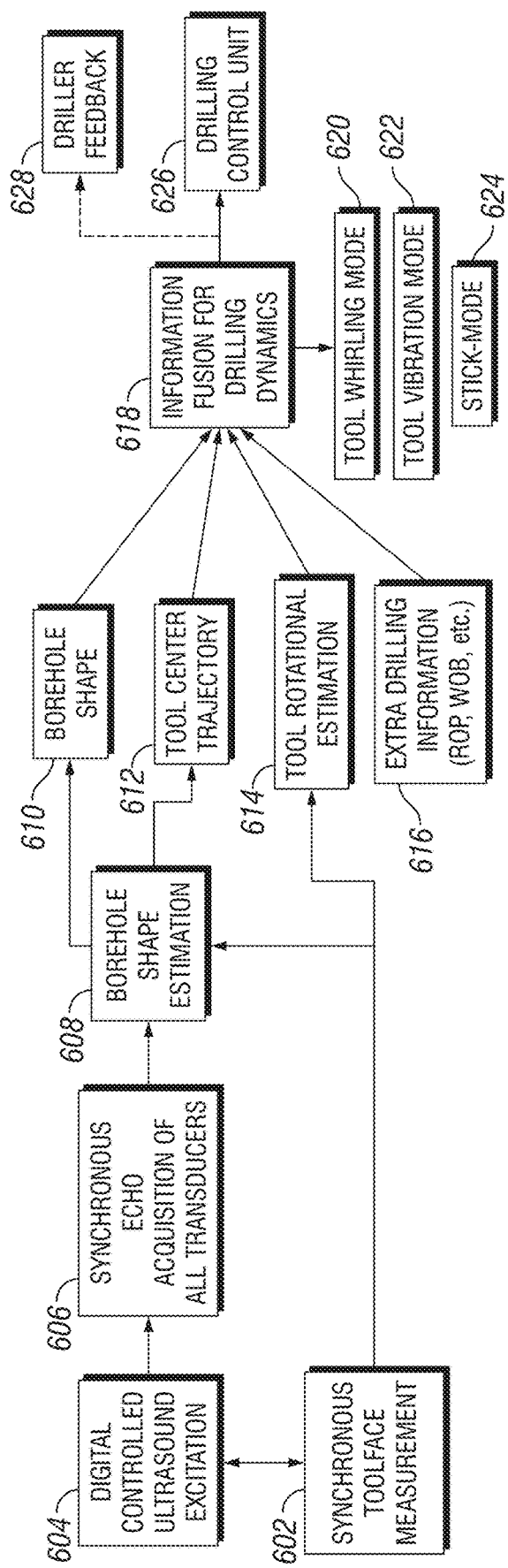
FIG. 6 is an example workflow for the operation of the measurement assembly.

FIG. 6 is an example of workflow 600 for determining tool motion with measurement assembly 134 (e.g., referring to FIG. 3). As illustrated, workflow 600 begins with block 602. In block 602, a synchronous tool face measurement is performed with digital subsystem 402 (e.g., referring to FIG. 4) on both rotation and center body motion of measurement assembly 134. Rotational motion may be acquired through a tool face measurement. Using gyro and magnetometer 416 (e.g., referring to FIG. 4), a tool face measurement may be calculated. At the same time, in block 604 a digital controlled ultrasound excitation is transmitted. This excitation may be used to measure the location of the center of measurement assembly 134 in real time. In block 606, the synchronous echo acquisition of all transducers is performed. A synchronous echo acquisition is when every transducer 136 (e.g., referring to FIG. 1) transmits and excitation at the same time, which may provide a measurement for the shape of borehole 102 (e.g., referring to FIG. 2) at a specific moment in time. Otherwise, the motion of measurement assembly 134 may be modulated into the measurement of the shape of borehole 102, which would provide an inaccurate measurement of the shape of borehole 102. Measurements from blocks 602-606 may be used in block 608 for borehole shape estimation. As discussed below, FIG. 7 details workflows 702 and 704 that describe specific processing steps to estimate borehole shapes in block 608.

In addition, measurement assembly 134 (e.g., referring to FIG. 1) the borehole shape estimation in block 608 may be used to determine borehole shape in block 610 and tool center trajectory in block 612. As discussed below, a borehole shape is calculated using borehole shape calculation 702 in FIG. 7. For example, block 610 may determine borehole shape, borehole acoustic impedance to see if there is hole enlargement, ovality or forming spiral groove as well as using acoustic impedance data to determine formation of rock types (fast or slow) drilled. Additionally, in block 614 tool rotational information is found from block 602. For example, gyro and magnetometers 416 (e.g., referring to FIG. 4) may measure the rotation of the tool and provide the measurements for further processing. Additionally, revelations-per-minute (RPM) may be derived by checking the time period of the signal. Block 616 may provide extra drilling information such as rate of penetration (ROP), weight on bit (WOB), torque on bit (TOB), and other downhole tool measurements. These measurements may come from other sensors or tools disposed on a tool string. The measurements form other sensors or tools may be communicated to information handling system 138 through wired or wireless communication. Additionally, other downhole sensor data may be combined with the measurements found above and analyzed to extract drilling control parameters to feed them to an operator and/or a downhole controller.

Block 618 is an information fusion for drilling dynamics. Without limitation, information fusion for drilling dynamics may implement a variety of algorithms and process using information handling system 138 (e.g., referring to FIG. 1) to determine tool whirl, tool vibration, and stick-slip. Identification of different types of movement of a downhole tool, such as bottom hole assembly 130, may allow for alteration to the operation and function of the downhole tool. For example, operation of information fusion and drilling dynamics in block 618 may be performed to obtain the critical information, which may allow for information handling system 138 to mitigate the whirling and torsional vibrations through the control of WOB, TOB, ROP, RPM, and others of the downhole tool. In one or more examples, information from the downhole tool may be linked to information handling system 138 by any suitable wireless or wired communication, which may allow for the transmission of drilling ROP or depth information to form real time borehole high quality images to identify fractures and borehole washouts, enlargement to real time drilling parameters in order to further optimize the drilling process. Beyond drilling control, geometric information of borehole shapes and the downhole tool location is beneficial to obtain correct amplitude peak of the reflected echoes from the borehole walls, which is further useful for rock reflectivity analysis. Additionally, artificial intelligence (AI) based information fusion systems may provide driller real time feedback to avoid drilling failure and improve drilling efficiency. It may also be fit into AI-based drilling systems which control the WOB, TOB, and RPM to optimize smooth and efficient drilling automatically. In one or more examples, an AI system may be an offline training or online executing system. Without limitation, the information from blocks 610-614 may be feed into an offline training system to obtain block 620-624, further discussed below. The AI system may be supervised or a combined supervised and unsupervised learning system. Operation and function of the AI system may be to determine if the RPM/WOB/TOB may be adjusted in any manner during drilling operations. After training the AI system with available field data from already known or real time sources, result from the AI system may be implemented by instructing information handling system 138 to identify measurements in block 610-614 in real time. The real tie measurements may be sent back to the AI system that may command information handling system 138 to adjust RPM, WOB, TOP, of the downhole tool during drilling operations.

Figure 13A:
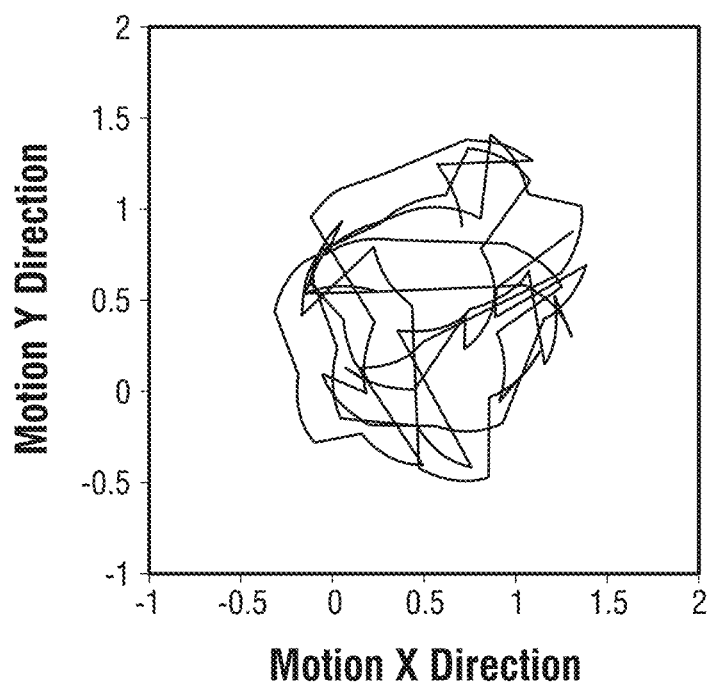
FIG. 13A illustrates measurements of chaotic whirl in accordance with embodiments of the present disclosure.
Figure 13B:
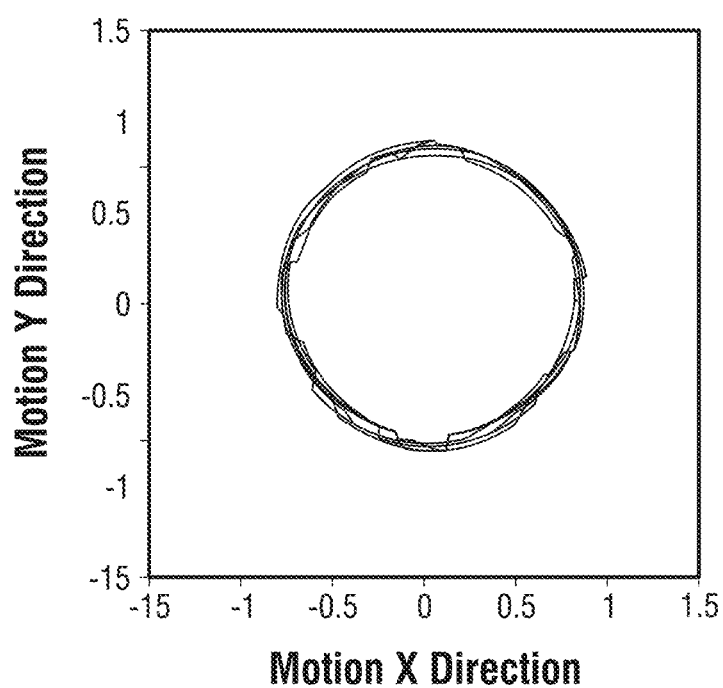
FIG. 13B illustrates measurements of forward whirl in accordance with embodiments of the present disclosure.

Using the information fusion for drilling dynamics in block 618, a user may be able to find downhole tool whirl information in block 620. Whirl is defined as the motion that a drill bit or downhole tool makes when it does not rotate about its center. Specifically, normal downhole tool rotation is when the downhole tool is revolving around its own center axis, tool whirling is tool center moving/revolving around some other points. Generally, whirl is an indication of poor drilling performance. FIGS. 13A and 13B illustrated different measurements of downhole tool whirl. FIG. 13A illustrated chaotic whirl and FIG. 13B illustrated forward whirl. To measure whirl, a whirling direction and speed may be calculated by averaging the time a full circle rotation of the downhole tool may be completed. This calculation may be performed numerically by information handling system 130 by analyzing the rotation of the downhole tool location on an x, y coordinate plane. This analysis may identify downhole tool motion trajectory, which may be further used below for additional measurements.

The information fusion for drilling dynamics in block 618 may be used to determine downhole tool vibration for block 622. Downhole tool vibration is defined as an oscillation of the body of the downhole tool. In examples, tool vibrational information may be derived by analyzing the standard deviation of the position logs over a fixed period of time. This derivation may be calculated from tool motion trajectory, which may be found from measuring tool whirl, as described above. By limiting the direction of the analysis in the x-y plane, directional vibrational information may be derived from the center location of the downhole tool in view of depth.

Stick-slip in block 624 may be found from information fusion for drilling dynamics in block 618. For example, irregular hole shape, numerically calculated, together with RPM surge and sudden change of the center position, found from downhole tool motion trajectory discussed above, of the downhole tool may indicate tool stick-slip. Stick-slip is defined as a spontaneous jerking motion that may occur while two objects, such as the downhole tool and formation, are sliding over each other. Together with borehole shape, tool rotational RPM, WOB, and ROP information may be provided. This information may be used to determine borehole conditions and drilling efficiency.

Information from block 618 may be sent to drilling control unit in block 626, this may allow for the automatic alteration in operations of the drilling operation to change. Additionally, the information from block 618 may act as driller feedback in block 628. This may allow for personnel to manually alter the operations of the drilling operation.

Figure 7:
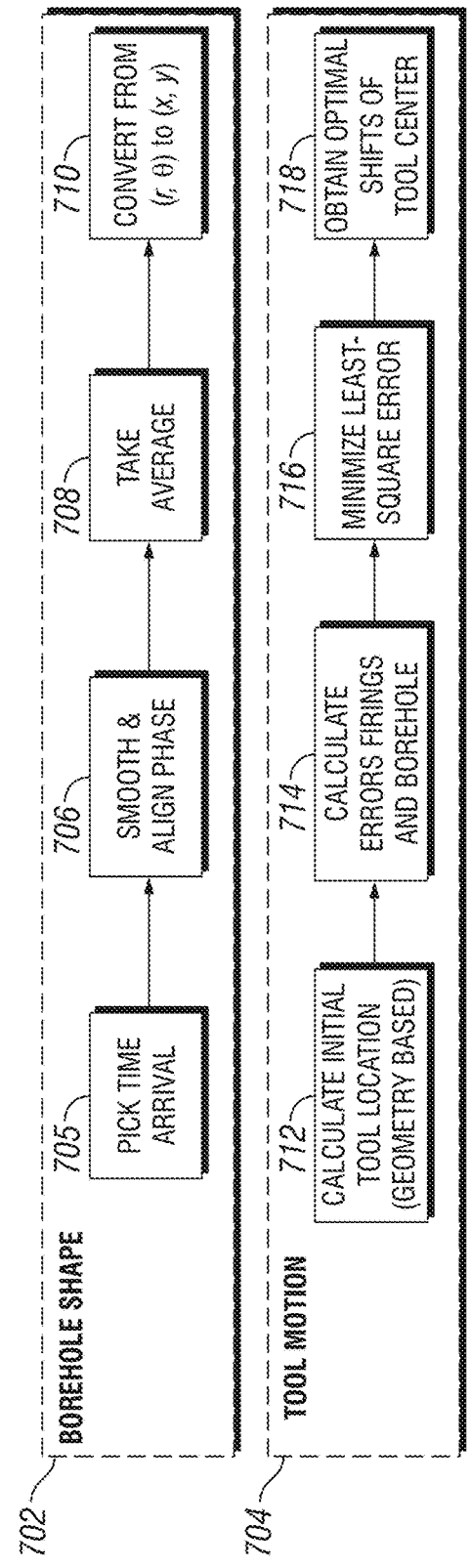
FIG. 7 is an example workflow for determining a borehole shape and tool motion.

FIG. 7 is an example of workflow 700 for determining a borehole shape calculation 702 and tool motion calculation 704. Borehole shape calculation 702 may include a first block 705 for time arrival pick of received echoes from four transducers 412 (e.g., referring to FIG. 4), block 706 for obtaining smooth and phase-aligned time arrival curves, block 708 for averaging of phase-aligned curves, and block 710 for conversion from the polar format of the averaged curve to the rectangular format, which is aimed to acquire borehole shape.

Figure 8A:
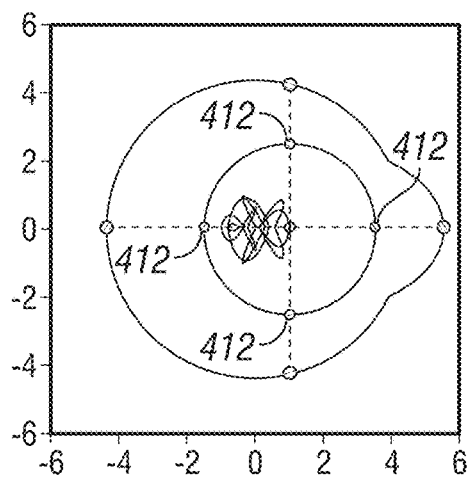
FIGS. 8A-8D are graphs for identifying the shape of the borehole in accordance with embodiments of the present disclosure.
Figure 8B:
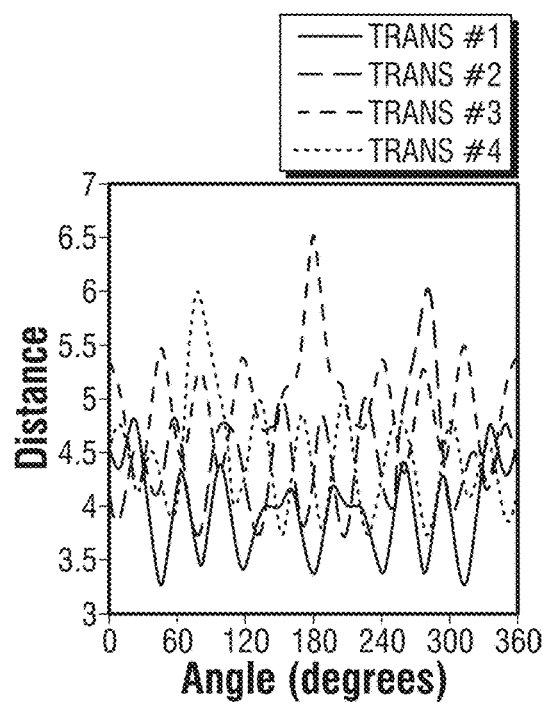
Figure 8C:
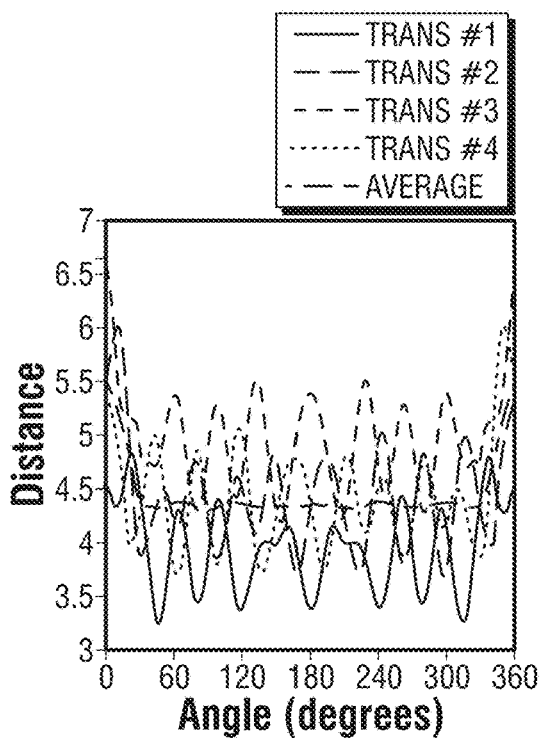
Figure 8D:
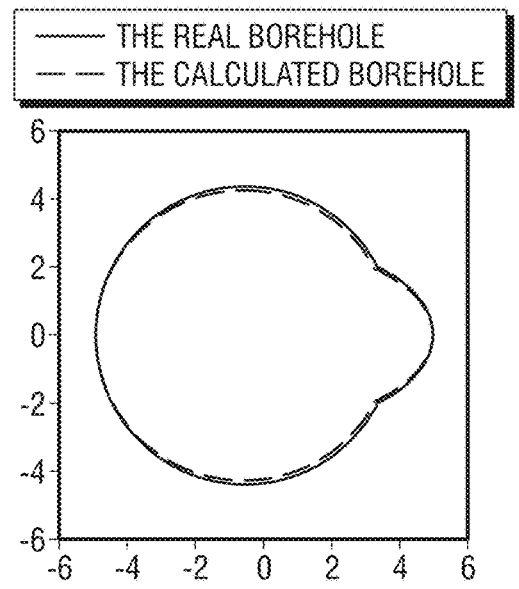

For a borehole shape calculation 702, the first block is to pick time arrival, which corresponds to the time of amplitude peak of reflected echoes from transducers 412 (e.g., referring to FIG. 4). For each transducer 412, the obtained time arrival may be described as time versus tool angle curves. By multiplying with the mud speed and adding with the tool radius, the time curves may be converted into distance versus tool angle curves as shown in FIG. 8B, further discussed below. Mud speed may be measured, input or from a lookup table as well as estimated from the data. block 706, referring back to FIG. 7, is to smooth and phase align the distance curves, which are obtained by associating the angular information with each distance measurement. FIG. 8B is an example plot of four distance curves obtained from four transducers 412. In block 706, smoothing may be performed with circular convolution or standard FIR/IIR filtering. Then, phase alignment is performed based on the location or phase of the transducers. The alignment removes the phase difference defined by the transducer mechanical offset. An example operation of four transducer 412 in a system is illustrated in FIG. 5. As shown in FIG. 8A, transducers 412 may be ninety degrees apart from each other. The phase-aligned curves are shown in FIG. 8C, where the result from each transducer 412 is shifted by its corresponding mechanical offset. block 708, referring back to FIG. 7, averaging the phase-aligned curves leads to the borehole shape estimation in a polar format as shown in FIG. 8C. block 710, referring back to FIG. 7, converts the borehole into the Cartesian format. FIG. 8D, further discussed below, shows the comparison between the real borehole and calculated borehole. As shown in FIG. 8D, the calculated borehole is in good agreement with the real borehole even though the tool center trajectory is in such a complex pattern.

Tool motion calculation 704 may be further estimated given a known borehole shape from borehole shape calculation 702. Referring back to FIG. 7, the following steps may be involved in the estimation of the center location of measurement assembly 134. Tool motion calculation 704 may begin with a first block 712 including a first guess of tool location based on ultrasonic transducer standoff measurement, block 714 for a least-square error calculation, block 716 for least-square error minimization, and block 718 for optimal shift acquisition and tool center trajectory formation.

Figure 9A:
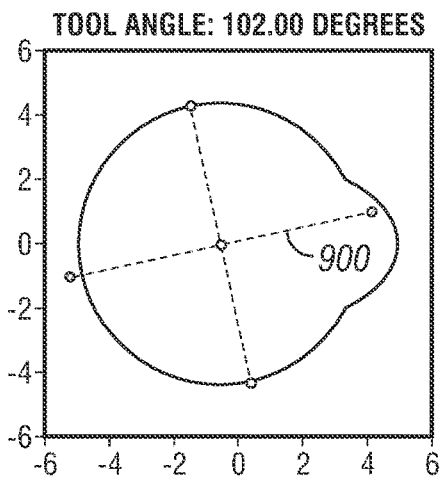
FIGS. 9A-9G are graphs for identifying the center of the measurement assembly in accordance with embodiments of the present disclosure.
Figure 9B:
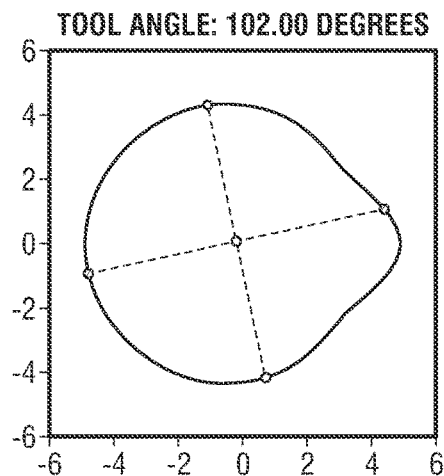
Figure 9C:
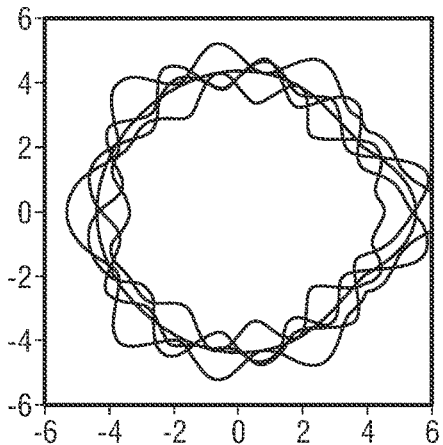
Figure 9D:
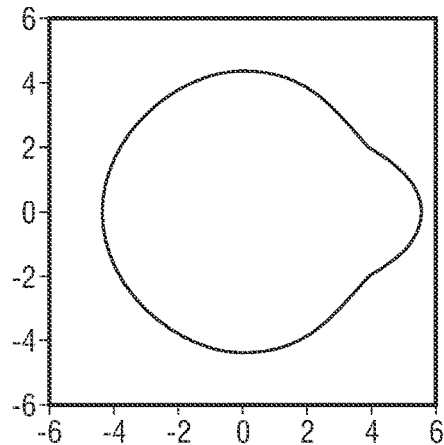
Figure 9E:
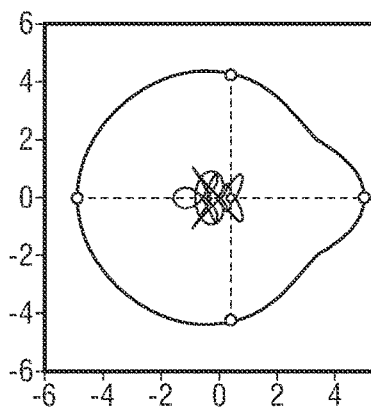
Figure 9F:
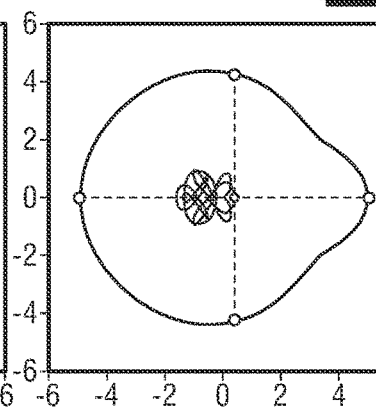
Figure 9G:
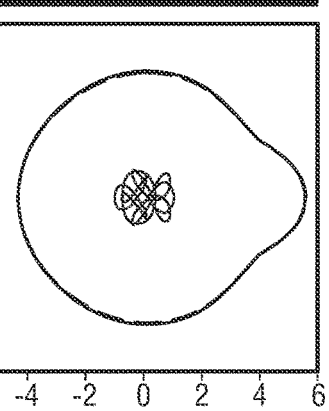

The method described above, may calculate the initial location of the tool center, then calculate the least-square error between the borehole and firings, and then minimize the error by shifting the tool location, and finally obtain the tool trajectory by combining all optimal shifts. FIGS. 9A-9G illustrate details of tool motion calculation process in accordance with example embodiments. FIGS. 9A and 9B show the firing of 102 degrees as an example before and after tool center shifting (i.e., least-square error minimization). Initial tool center 900 in FIG. 9A is calculated by distance differences measured from pairs of transducers 412 (e.g., referring to FIG. 5). For example, pairs of transducers 412 may be the transducers that may be about 180 degrees from each other. Notice that if the borehole is a standard circle, tool center 900 may be accurately located by this way. A more special case is that the tool center locating at origin if there is not a distance differences from two transducer pairs. Given the borehole and initial tool location, lease-square fitting or lease-square error minimization may be executed, and the optimal shifts of the tool center may be obtained. FIGS. 9C and 9D compare all firings before and after tool motion calculation. As illustrated in FIG. 9C all firing data may be converging into the same calculated borehole shape after tool center shifting. FIGS. 9E and 9F compare the tool trajectory before and after optimal shifting via least-square error minimization. FIG. 9G compares both the borehole shape and tool center trajectory between the real and calculated ones. As illustrated in FIG. 9G, both borehole shape and tool trajectory may be reconstructed accurately.

Figure 10A:
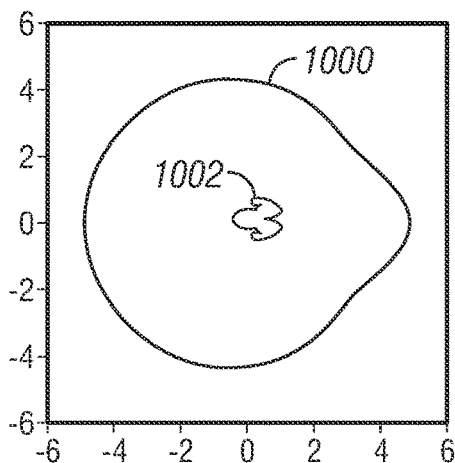
FIGS. 10A-10C are graphs for identifying the shape of the borehole and motion of the measurement assembly in accordance with embodiments of the present disclosure.
Figure 10B:
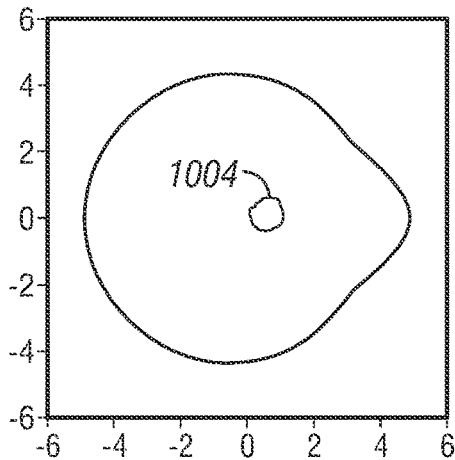
Figure 10C:
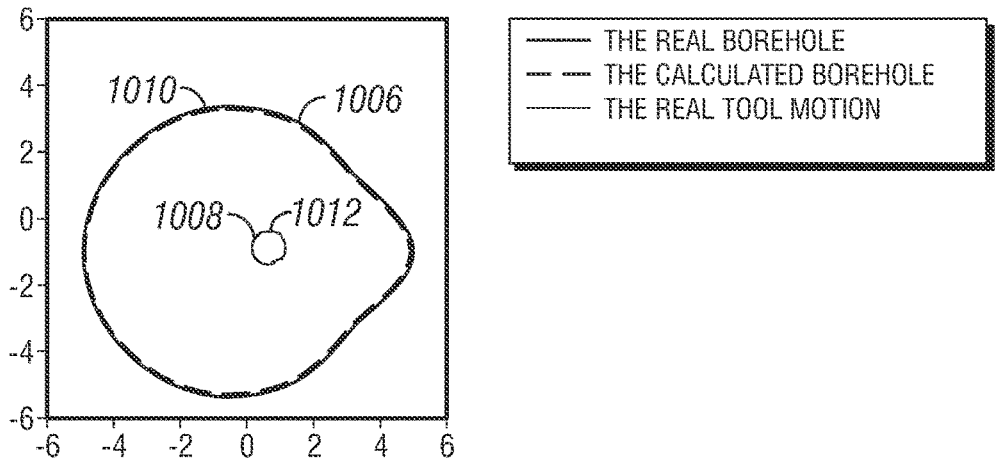

FIGS. 10A-10C are graphs illustrating a calculation process for determining motion of measurement assembly 134 (e.g., referring to FIG. 3) in accordance with example embodiments. FIG. 10A is a graph that illustrates an estimated borehole 1000 and a first guess 1002 of the tool center trajectory, which may be calculated by distance differences measured from at least on transducer 412 (e.g., referring to FIG. 4). Given first guess 1002 of the location of measurement assembly 134, lease-square error between each firing and the borehole contour may be calculated. Then, least-square error minimization may be executed by searching for the optimal shifts of the center of measurement assembly 134. The optimal shifts may lead to center trajectory 1004 as shown in FIG. 10B. FIG. 10C plots calculated borehole 1006 and calculated tool center trajectory 1008 overlaid on real borehole 1010 and real tool center trajectory 1012. As illustrated in FIG. 10C, both borehole shape and tool trajectory may be reconstructed with very high accuracy after the algorithm described here.

Figure 11A:
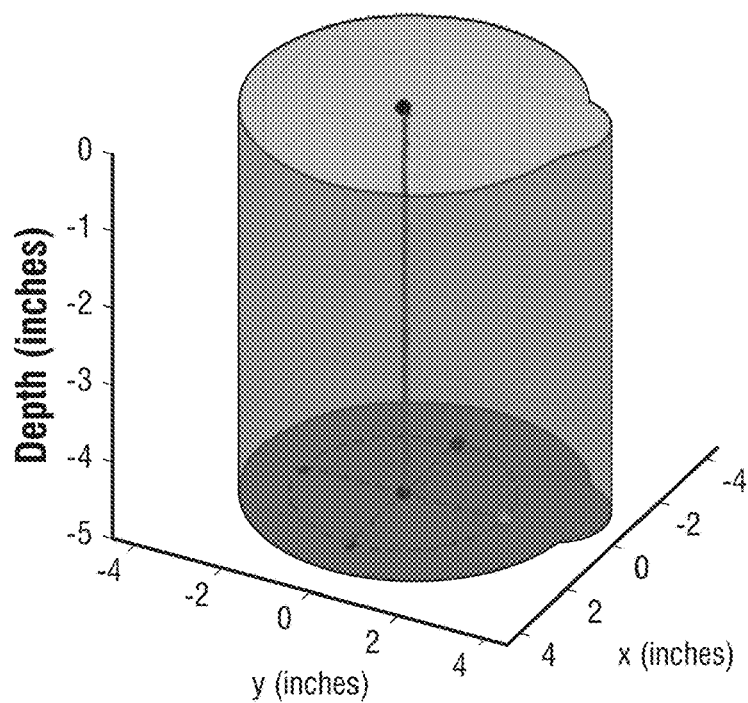
FIGS. 11A and 11B are graphs of the borehole and motion of the measurement assembly per depth in three-dimensional space in accordance with embodiments of the present disclosure.
Figure 11B:
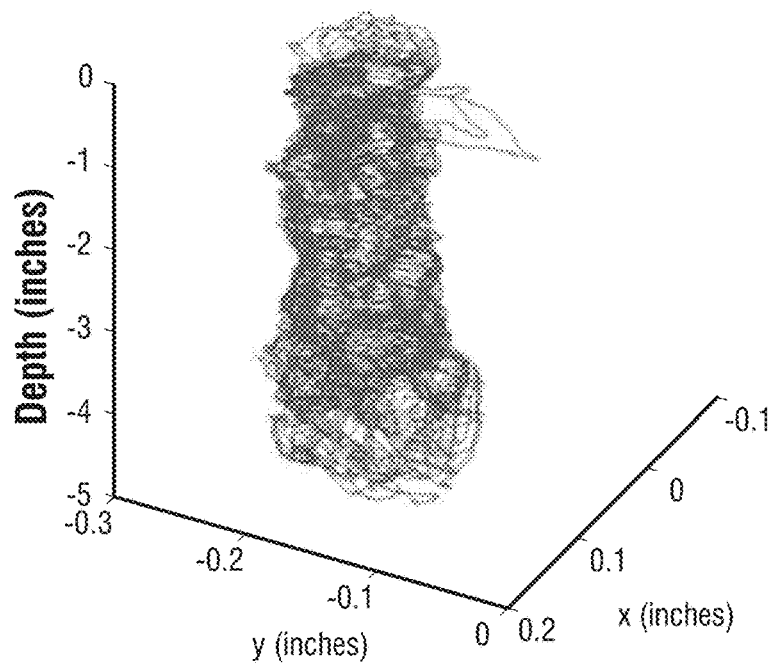

With the calculated borehole shape and tool location, tool movement information may be reviewed and used for drilling dynamic analysis. FIGS. 11A and 11B illustrate an example of tool movement with the disclosed system and method. The borehole with breakouts may be shown in FIG. 11A, while the derived tool center locations in 3D zoom-in version may be shown in FIG. 11B.

Combining the tool center location information with the tool rotational RPMs, the severity of tool whirling, the torsional as well as its lateral vibrations may be inferred. This critical information may be both transmitted through a mud pulse telemetry system to the surface or a wired drill pipe communication system to the surface to provide real-time feedback to guide the drilling operations and send to a downhole drilling controller to adjust the corresponding drilling controllable parameters.

Figure 12:
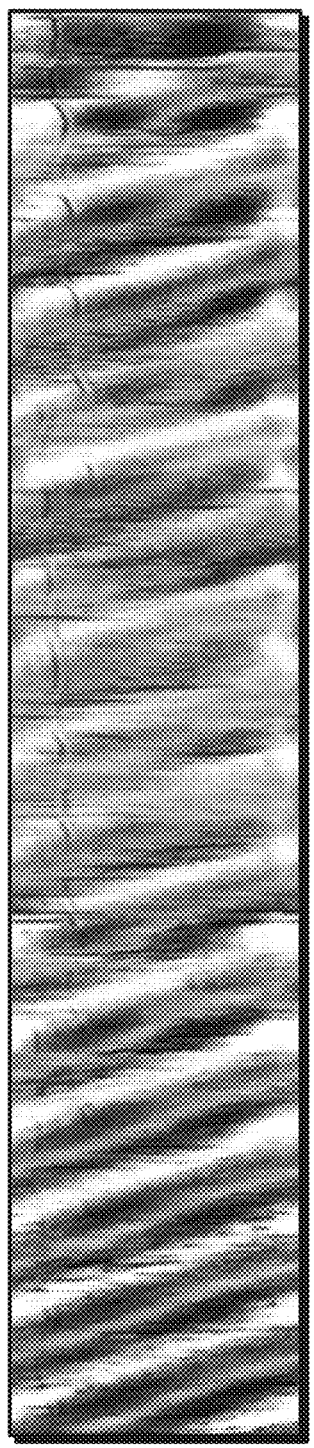
FIG. 12 illustrates a section of a borehole impedance image in accordance with embodiments of the present disclosure.

If one downlinks the ROP or depth information, other potential products of our measurement system may be capable to generate real-time fine borehole images near the bit and one may use a downhole AI system to analyze those images in order to report real-time drilling quality issues, as an example shown in FIG. 12, wherein FIG. 12 illustrates a section of borehole with deep spiral cuts. An accurate ROP information may not be necessary due to the majority of features affecting drilling are not sensitive to the axial image stretching.

As discussed above, a drilling control measurement system has been engineered, which may calculate and characterize real-time tool center motions and send those results up hole to the driller by means of mud-pulse or wired pipe telemetry. This may allow the driller to mitigate the shock and vibrations in real time. The severity and whirl frequency may be quantified. In addition, other real time products related to our measurement system may be the hole shape/quality, and its acoustic impedance, which may relate to fast or slow rock drilled. Therefore, a critical link and feedback loop between unwanted drilling vibrations, hole quality, and drilling controlling parameters, for example, WOB, TOB, ROP, RPM, mud weights as well as circulating speed, etc. may be established in real time.

With abundant drilling data using our real time feedback loop measurement system, one may build an AI drilling optimization and controlling system. Therefore, an AI-based drilling automation and optimization system may maximize the drilling efficiency and hole quality as well as to reduce drilling cost and failures.

Statement 1: A method for determining motion of a downhole tool and feeding back drilling performance may comprise taking a synchronous tool face measurement of the downhole tool, taking a synchronous pulse-echo acquisition to estimate a shape of a borehole, identifying a center trajectory for the downhole tool, identifying a rotational time and a position for the downhole tool, identifying one or more measurements of the downhole tool, inputting at least the shape of the borehole, the center trajectory of the downhole tool, the rotational time of the downhole tool, the position of the downhole tool, and the one or more measurements of the downhole tool into an information fusion for drilling dynamics, identifying at least one of a whirl of the downhole tool, a vibration of the downhole tool, or a stick-slip of the downhole tool from the information fusion for drilling dynamics, and identifying one or more borehole condition and a drilling efficiency based at least in part on the whirl of the downhole tool, the vibration of the downhole tool, and/or the stick-slip of the downhole tool.

Statement 2. The method of statement 1, wherein the downhole tool is a bottom hole assembly.

Statement 3. The method of statements 1 or 2, wherein the one or more measurements are rate or penetration, weight on bit, revolutions per minute, or torque on bit.

Statement 4. The method of statements 1-3, further comprising altering the downhole tool based at least in part on the one or more borehole condition and the drilling efficiency.

Statement 5. The method of statements 1-4, wherein the estimate the shape of the borehole may comprise picking a time arrival, smoothing the time arrival, aligning a phase of the time arrival, and averaging the phase of the time arrival.

Statement 6. The method of statement 5, further comprising multiplying a mud speed and adding a radius of the downhole to produce a time curve and converting the time curve into a distance versus tool angle curve.

Statement 7. The method of statement 6, wherein the smoothing the time arrival is performed with a circular convolution.

Statement 8. The method of statement 7, wherein the aligning the phase of the time arrival is performed by applying a mechanical offset based at least in part on location of at least two transducers.

Statement 9. The method of statements 1-5, wherein the rotational time and the position for the downhole tool is found from a gyro or a magnetometer.

Statement 10. The method of statements 1-5 or 9, wherein identifying the center trajectory for the downhole tool may comprise calculating an initial downhole tool location, calculating for a least-square error, calculating for a minimization of the least-square error, and determining a shift acquisition.

Statement 11. The method of statement 10, further comprising comparing a trajectory of the downhole tool before the minimization of the least-square error and after the minimization of the least-square error.

Statement 12. The method of statement 11, further comprising reconstructing the trajectory of the downhole tool and the shape of the borehole.

Statement 13. A system may comprise a downhole tool, wherein the downhole tool may comprise at least two transducers and wherein the at least two transducers are configured to emit a pressure pulse and record an echo, and an information handling system. The information handling system may be configured to identify a downhole tool center trajectory, identify the downhole tool rotational information, identify one or more measurements of the downhole tool, and input at least a shape of a borehole, the downhole tool center trajectory; the downhole tool rotational information, and the one or more measurements of the downhole tool into an information fusion for drilling dynamics to identify at least one of a whirling of the downhole tool, a vibration of the downhole tool, or a stick-slip of the downhole tool.

Statement 14. The system of statement 13, wherein the one or more measurements are rate or penetration, weight on bit, revolutions per minute, or torque on bit.

Statement 15. The system of statements 13 or 14, wherein the information handling system is further configured to alter the downhole tool based at least in part on the whirling of the downhole tool, the vibration of the downhole tool, or the stick-slip of the downhole tool.

Statement 16. The system of statements 13-15, wherein to estimate a shape of a borehole may comprise picking a time arrival, smoothing the time arrival, aligning a phase of the time arrival, and averaging the phase of the time arrival.

Statement 17. The system of statement 16, wherein the smoothing the time arrival is performed with a circular convolution.

Statement 18. The system of statement 16, wherein to identify the downhole tool center trajectory may comprise calculating an initial downhole tool location, calculating for a least-square error, calculating for a minimization of the least-square error, and determining a shift acquisition.

Statement 19. The system of statement 18, further comprising comparing a trajectory of the downhole tool before the minimization of the least-square error and after the minimization of the least-square error.

Statement 20. The system of statement 19, further comprising reconstructing the trajectory of the downhole tool and the shape of the borehole.

It should be understood that, although individual examples may be discussed herein, the present disclosure covers all combinations of the disclosed examples, including, without limitation, the different component combinations, method block combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for determining motion of a downhole tool and feeding back drilling performance comprising:
    synchronously taking a tool face measurement of a downhole tool and a pulse-echo acquisition, wherein one or more transducers transmit an excitation at the same time, and wherein the pulse-echo acquisition creates pulse-echo acquisition data;
    calculating an initial downhole tool location;
    identifying a center trajectory for the downhole tool based at least in part from the initial downhole tool location, wherein identifying the center trajectory for the downhole tool comprises:
        calculating a least-square error of the synchronous pulse-echo acquisition data;
        minimizing the least-square error; and
        determining an acquisition shift value of the center trajectory for the downhole tool;
    identifying a rotational time and a position for the downhole tool;
    identifying measurement data of the downhole tool;
    inputting at least the shape of the borehole, the center trajectory of the downhole tool, the rotational time of the downhole tool, the position of the downhole tool, and the measurement data of the downhole tool into an information fusion for drilling dynamics;
    identifying at least one of a whirl of the downhole tool, a vibration of the downhole tool, or a stick-slip of the downhole tool from the information fusion for drilling dynamics; and
    identifying one or more borehole condition and a drilling efficiency based at least in part on the whirl of the downhole tool, the vibration of the downhole tool, and/or the stick-slip of the downhole tool.

2. The method of claim 1, wherein the downhole tool is a bottom hole assembly.

3. The method of claim 1, wherein the measurement data are rate of penetration, weight on bit, revolutions per minute, or torque on bit.

4. The method of claim 1, further comprising altering the downhole tool based at least in part on the one or more borehole condition and the drilling efficiency.

5. The method of claim 1, wherein the estimate the shape of the borehole comprises:
    picking a time arrival of the acquired pulse-echo;
    producing a time curve from the acquired pulse-echo;
    smoothing the time curve;
    aligning a phase of the time curve to create at least a phase-aligned time curve; and
    averaging at least the phase-aligned time curve.

6. The method of claim 5, further comprising converting the time curve into a distance versus tool angle curve.

7. The method of claim 6, wherein the smoothing the time arrival is performed with a circular convolution.

8. The method of claim 7, wherein the aligning the phase of the time arrival is performed by applying a mechanical offset based at least in part on location of at least two transducers of the one or more transducers.

9. The method of claim 1, wherein the rotational time and the position for the downhole tool is found from a gyro or a magnetometer.

10. The method of claim 1, further comprising comparing a trajectory of the downhole tool before the minimization of the least-square error and after the minimization of the least-square error.

11. The method of claim 10, further comprising reconstructing the trajectory of the downhole tool and the shape of the borehole.

12. A system comprising:
a downhole tool, wherein the downhole tool comprises:
at least two transducers, wherein the at least two transducers emit a pressure pulse synchronously and record an echo to create synchronous pulse-echo data; and
an information handling system to:
calculate an initial downhole tool location;
identify a center trajectory for the downhole tool based at least in part from the initial downhole tool location, wherein the identify the downhole tool center trajectory comprises:
calculate a least-square error of the synchronous pulse-echo acquisition data;
minimize the least-square; and
determine an acquisition shift value of the center trajectory for the downhole tool;
identify the downhole tool rotational information, wherein the downhole tool rotational information is identified synchronously with the pressure pulse emitted by the at least two transducers;
identify measurement data of the downhole tool; and
input at least a shape of a borehole, the downhole tool center trajectory; the downhole tool rotational information, and the measurement data of the downhole tool into an information fusion for drilling dynamics to identify at least one of a whirling of the downhole tool, a vibration of the downhole tool, or a stick slip of the downhole tool.

13. The system of claim 12, wherein the measurement data are rate of penetration, weight on bit, revolutions per minute, or torque on bit.

14. The system of claim 12, wherein the information handling system further alters the downhole tool based at least in part on the whirling of the downhole tool, the vibration of the downhole tool, or the stick slip of the downhole tool.

15. The system of claim 12, further comprising comparing a trajectory of the downhole tool before the minimization of the least-square error and after the minimization of the least-square error.

16. The system of claim 15, further comprising reconstructing the trajectory of the downhole tool and the shape of the borehole.

17. A method for determining motion of a downhole tool and feeding back drilling performance comprising:
taking a synchronous tool face measurement of the downhole tool;
taking a synchronous pulse-echo acquisition to estimate a shape of a borehole, wherein the estimate the shape of the borehole comprises:
picking a time arrival;
smoothing the time arrival;
aligning a phase of the time arrival; and
averaging the phase of the time arrival;
multiplying a mud speed and adding a radius of the downhole tool to produce a time curve and converting the time curve into a distance versus tool angle curve;
identifying a center trajectory for the downhole tool;
identifying a rotational time and a position for the downhole tool;
identifying measurement data of the downhole tool;
inputting at least the shape of the borehole, the center trajectory of the downhole tool, the rotational time of the downhole tool, the position of the downhole tool, and the measurement data of the downhole tool into an information fusion for drilling dynamics;
identifying at least one of a whirl of the downhole tool, a vibration of the downhole tool, or a stick-slip of the downhole tool from the information fusion for drilling dynamics; and
identifying one or more borehole condition and a drilling efficiency based at least in part on the whirl of the downhole tool, the vibration of the downhole tool, and/or the stick-slip of the downhole tool.

18. A method for determining motion of a downhole tool and feeding back drilling performance comprising:
taking a synchronous tool face measurement of the downhole tool;
taking a synchronous pulse-echo acquisition to estimate a shape of a borehole, wherein the estimate the shape of the borehole comprises:
picking a time arrival;
smoothing the time arrival, wherein the smoothing the time arrival is performed with a circular convolution;
aligning a phase of the time arrival; and
averaging the phase of the time arrival;
multiplying a mud speed and adding a radius of the downhole tool to produce a time curve and converting the time curve into a distance versus tool angle curve;
identifying a center trajectory for the downhole tool;
identifying a rotational time and a position for the downhole tool;
identifying measurement data of the downhole tool;
inputting at least the shape of the borehole, the center trajectory of the downhole tool, the rotational time of the downhole tool, the position of the downhole tool, and the measurement data of the downhole tool into an information fusion for drilling dynamics;
identifying at least one of a whirl of the downhole tool, a vibration of the downhole tool, or a stick-slip of the downhole tool from the information fusion for drilling dynamics; and
identifying one or more borehole condition and a drilling efficiency based at least in part on the whirl of the downhole tool, the vibration of the downhole tool, and/or the stick-slip of the downhole tool.

19. A method for determining motion of a downhole tool and feeding back drilling performance comprising:
taking a synchronous tool face measurement of the downhole tool;
taking a synchronous pulse-echo acquisition to estimate a shape of a borehole, wherein the estimate the shape of the borehole comprises:
picking a time arrival;
smoothing the time arrival, wherein the smoothing the time arrival is performed with a circular convolution;
aligning a phase of the time arrival, wherein the aligning the phase of the time arrival is performed by applying a mechanical offset based at least in part on location of at least two transducers; and
averaging the phase of the time arrival;
multiplying a mud speed and adding a radius of the downhole tool to produce a time curve and converting the time curve into a distance versus tool angle curve;
identifying a center trajectory for the downhole tool;

identifying a rotational time and a position for the downhole tool;
identifying measurement data of the downhole tool;
inputting at least the shape of the borehole, the center trajectory of the downhole tool, the rotational time of the downhole tool, the position of the downhole tool, and the measurement data of the downhole tool into an information fusion for drilling dynamics;
identifying at least one of a whirl of the downhole tool, a vibration of the downhole tool, or a stick-slip of the downhole tool from the information fusion for drilling dynamics; and
identifying one or more borehole condition and a drilling efficiency based at least in part on the whirl of the downhole tool, the vibration of the downhole tool, and/or the stick-slip of the downhole tool.

20. A method for determining motion of a downhole tool and feeding back drilling performance comprising:
taking a synchronous tool face measurement of the downhole tool;
taking a synchronous pulse-echo acquisition to estimate a shape of a borehole;
identifying a center trajectory for the downhole tool wherein identifying the center trajectory for the downhole tool comprises:
calculating an initial downhole tool location;
calculating a least-square error of the synchronous pulse-echo acquisition data;
minimizing the least-square error; and
determining an acquisition shift value of the center trajectory for the downhole tool;
identifying a rotational time and a position for the downhole tool;
identifying measurement data of the downhole tool;
inputting at least the shape of the borehole, the center trajectory of the downhole tool, the rotational time of the downhole tool, the position of the downhole tool, and the measurement data of the downhole tool into an information fusion for drilling dynamics;
identifying at least one of a whirl of the downhole tool, a vibration of the downhole tool, or a stick-slip of the downhole tool from the information fusion for drilling dynamics; and
identifying one or more borehole condition and a drilling efficiency based at least in part on the whirl of the downhole tool, the vibration of the downhole tool, and/or the stick-slip of the downhole tool.

21. A method for determining motion of a downhole tool and feeding back drilling performance comprising:
taking a synchronous tool face measurement of the downhole tool;
taking a synchronous pulse-echo acquisition to estimate a shape of a borehole;
identifying a center trajectory for the downhole tool wherein identifying the center trajectory for the downhole tool comprises:
calculating an initial downhole tool location;
calculating a least-square error of the synchronous pulse-echo acquisition data;
minimizing the least-square error; and
determining an acquisition shift value of the center trajectory for the downhole tool;
comparing a trajectory of the downhole tool before the minimization of the least-square error and after the minimization of the least-square error;
identifying a rotational time and a position for the downhole tool;
identifying measurement data of the downhole tool;
inputting at least the shape of the borehole, the center trajectory of the downhole tool, the rotational time of the downhole tool, the position of the downhole tool, and the measurement data of the downhole tool into an information fusion for drilling dynamics;
identifying at least one of a whirl of the downhole tool, a vibration of the downhole tool, or a stick-slip of the downhole tool from the information fusion for drilling dynamics; and
identifying one or more borehole condition and a drilling efficiency based at least in part on the whirl of the downhole tool, the vibration of the downhole tool, and/or the stick-slip of the downhole tool.

22. A method for determining motion of a downhole tool and feeding back drilling performance comprising:
taking a synchronous tool face measurement of the downhole tool;
taking a synchronous pulse-echo acquisition to estimate a shape of a borehole;
identifying a center trajectory for the downhole tool wherein identifying the center trajectory for the downhole tool comprises:
calculating an initial downhole tool location;
calculating a least-square error of the synchronous pulse-echo acquisition data;
minimizing the least-square error; and
determining an acquisition shift value of the center trajectory for the downhole tool;
comparing a trajectory of the downhole tool before the minimization of the least-square error and after the minimization of the least-square error;
reconstructing the trajectory of the downhole tool and the shape of the borehole;
identifying a rotational time and a position for the downhole tool;
identifying measurement data of the downhole tool;
inputting at least the shape of the borehole, the center trajectory of the downhole tool, the rotational time of the downhole tool, the position of the downhole tool, and the measurement data of the downhole tool into an information fusion for drilling dynamics;
identifying at least one of a whirl of the downhole tool, a vibration of the downhole tool, or a stick-slip of the downhole tool from the information fusion for drilling dynamics; and
identifying one or more borehole condition and a drilling efficiency based at least in part on the whirl of the downhole tool, the vibration of the downhole tool, and/or the stick-slip of the downhole tool.

\* \* \* \* \*